(12) United States Patent
Guo et al.

(10) Patent No.: US 11,973,803 B2
(45) Date of Patent: Apr. 30, 2024

(54) STABILITY CRITERION FOR TIME-DELAY OF CYBER-PHYSICAL POWER SYSTEMS UNDER DISTRIBUTED CONTROL

(71) Applicant: Tsinghua University, Beijing (CN)

(72) Inventors: Qinglai Guo, Beijing (CN); Hongbin Sun, Beijing (CN); Luo Xu, Beijing (CN); Wenchuan Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 414 days.

(21) Appl. No.: 17/328,321

(22) Filed: May 24, 2021

(65) Prior Publication Data

US 2022/0255964 A1 Aug. 11, 2022

(30) Foreign Application Priority Data

Jan. 29, 2021 (CN) .......................... 202110127722.3

(51) Int. Cl.
H04L 9/40 (2022.01)
(52) U.S. Cl.
CPC .......... *H04L 63/20* (2013.01); *H04L 63/1416* (2013.01); *H04L 63/168* (2013.01)
(58) Field of Classification Search
CPC ... H04L 63/1416; H04L 63/168; H04L 63/20; H02J 2203/10; H02J 2203/20
See application file for complete search history.

(56) References Cited

U.S. PATENT DOCUMENTS

| 2013/0198847 A1* | 8/2013 | Sampigethaya | .... H04L 63/1433 726/25 |
| 2015/0378339 A1* | 12/2015 | Ji | ........................ H04L 63/1408 700/73 |

OTHER PUBLICATIONS

L. Xu, Q. Guo, Z. Wang and H. Sun, "Modeling of Time-Delayed Distributed Cyber-Physical Power Systems for Small-Signal Stability Analysis," in IEEE Transactions on Smart Grid, vol. 12, No. 4, pp. 3425-3437, Date of Publication: Jan. 18, 2021, doi: 10.1109/TSG.2021.3052303. (Year: 2021).*

(Continued)

*Primary Examiner* — Daniel B Potratz
*Assistant Examiner* — Matthias Habtegeorgis
(74) *Attorney, Agent, or Firm* — Hodgson Russ LLP (57) ABSTRACT

The present disclosure provides a stability criterion for time-delay of cyber-physical power systems under distributed control, which relates to a field of cyber-physical power systems technologies. The method first establishes an cyber side model of the cyber-physical power systems under distributed control and a physical power grid model of the cyber-physical power systems under distributed control respectively; then establishes simultaneous equations of the cyber side model and the physical power grid model to establish an unified differential algebraic equation model of the cyber-physical power systems under distributed control, so as to obtain a time-delay characteristic equation expression of the cyber-physical power systems under distributed control; determines a time-delay of each node, and solving the time-delay characteristic equation expression to obtain a maximum characteristic root, and performing the stability criterion for the time-delay of the cyber-physical power systems under distributed control according to a real part of the maximum characteristic root.

17 Claims, 1 Drawing Sheet

(56) References Cited

OTHER PUBLICATIONS

Xu, Luo et al, "Modeling of Time-Delayed Distributed Cyber-Physical Power Systems for Small-Signal Stability Analysis", IEEE Transactions on Smart Grid, Jul. 2021, pp. 3425-3437, vol. 12, Issue 4, IEEE.
CNIPA, First Office Action for CN 202110127722.3, dated Apr. 15, 2022.

* cited by examiner

STABILITY CRITERION FOR TIME-DELAY OF CYBER-PHYSICAL POWER SYSTEMS UNDER DISTRIBUTED CONTROL

CROSS-REFERENCE TO RELATED APPLICATION

This application claims priority to Chinese Patent Application No. 202110127722.3, filed Jan. 29, 2021, the entire disclosure of which is incorporated by reference herein.

FIELD

The present disclosure relates to a field of cyber-physical power systems, and more particularly to a stability criterion for time-delay of cyber-physical power systems under distributed control.

BACKGROUND

Modern power systems have an in-depth interdependence between a cyber side and a physical side, and have become typical cyber-physical systems (CPS). The cyber-physical systems are complex systems constructing physical spaces and cyber spaces which are mapped each other and efficiently cooperated through advanced technologies such as perception, calculation, communication and control. In the field of smart grid technologies, the modern smart grid has been widely regarded as a kind of cyber-physical power systems due to physical power systems relying on many advanced information technology manners.

An influence of time-delays on the cyber-physical power systems cannot be ignored more and more. Dispatchers of the modern power systems have put forward extremely high requirements of time-delay on various optimized scheduling and control services. In particular, stability of the systems may be affected due to commands not being issued timely caused by the time-delay of the control services being too long. Therefore, there have been many methods to study a stability criterion of time-delay power systems under centralized control. With developments of distributed power sources, application prospects of various kinds of distributed architectures, such as distributed frequency control, voltage control in the cyber-physical power systems are becoming wider and wider. Therefore, the cyber-physical power systems under distributed control may be regarded as a kind of distributed cyber-physical power systems. Due to high dependence on the cyber systems, the stability of the distributed cyber-physical power systems has also become a key issue for distributed applications. Existing technical methods for a stability criterion for time-delay are mainly oriented to centralized cyber-physical power systems, whose time delays are relatively single (for example, Rekasius substitution is used to perform the stability criterion for the cyber-physical power systems under centralized/local time-delay power system stabilizers), but a criterion method for the distributed cyber-physical power systems is still blank. Therefore, the existing methods are not enough to analyze the stability for time-delay of the cyber-physical power systems under distributed control.

SUMMARY

The present disclosure seeks to solve at least one of the problems existing in the related art, and provides a stability criterion for time-delay of cyber-physical power systems under distributed control. The present disclosure is oriented to the stability for time-delay of the cyber-physical power systems under distributed control, and determines whether the cyber-physical power systems will be unstable under a specific time-delay. The method of the present disclosure may be applied to architecture design, communication networking and formulation of communication requirements of the power system under distributed control, and may clarify an influence of the distributed control on the stability of the cyber-physical power systems under different time-delays.

The present disclosure provides the stability criterion for time-delay of the cyber-physical power systems under distributed control. The method includes: establishing a cyber side model of the cyber-physical power systems under distributed control and a physical power grid model of the cyber-physical power systems under distributed control respectively; then establishing simultaneous equations of the cyber side model and the physical power grid model to establish an unified differential algebraic equation model of the cyber-physical power systems under distributed control, so as to obtain a time-delay characteristic equation expression of the cyber-physical power systems under distributed control; finally determining a time-delay of each node, and solving the time-delay characteristic equation expression to obtain a maximum characteristic root, and performing the stability criterion for time-delay of the cyber-physical power systems under distributed control according to a real part of the maximum characteristic root.

The method includes the following blocks.

1) The cyber side model of the cyber-physical power systems under distributed control is established. The detailed blocks are as follows.

1.1) An equation for a measuring link of each node of the cyber-physical power systems under distributed control is established.

The equation for the measuring link of a node i of the cyber-physical power systems under distributed control is as follows.

$$z_i^c(t) = \begin{bmatrix} M_{x,i} & 0 \\ 0 & M_{y,i} \end{bmatrix} \begin{bmatrix} x_i^p(t - \tau_{m,i}) \\ y_i^p(t - \tau_{m,i}) \end{bmatrix} \quad (13)$$

where a superscript c denotes a cyber side of the cyber-physical power systems, a superscript p denotes a physical side of the cyber-physical power systems, $x_i^p(t-\tau_{m,i})$ denotes a physical state variable of the node i at time point $t-\tau_{m,i}$, $y_i^p(t-\tau_{m,i})$ denotes a physical algebraic variable of the node i at time point $t-\tau_{m,i}$, $z_i^c(t)$ denotes a cyber measuring variable of the node i at time point t, $\tau_{m,i}$ denotes a time-delay for measuring of the node i, $M_{x,i}$ denotes an incidence matrix from the physical state variable of the node i to the cyber measuring variable of the node i, and $M_{y,i}$ denotes an incidence matrix from the physical algebraic variable of the node i to the cyber measuring variable of the node i.

1.2) An equation for a communication iterative calculating link of each node of the cyber-physical power systems under distributed control is established.

The equation for the communication iterative calculating link of the node i of the cyber-physical power systems under distributed control is as follows.

$$\dot{x}_i^c(t) = h_i(z_i^c(t), x_{j \in N_i}^c(t - \tau_{c,ij})) \quad (14)$$

where $x_i^c(t)$ denotes a cyber state variable of the node i at time point t, $\dot{x}_i^c(t)$ denotes a differential of $x_i^c(t)$ with respect to time, N denotes a set of reference numbers of neighbor nodes communicating with the node i each other, $x_{j \in N_i}^c(t)$ denotes a cyber state variable of the neighbor node of the node i at time point $\tau_{c,ij}$ denotes a time-delay for communication between the node i and a neighbor node j of the node i, and h denotes an iterative correction function of the node i under distributed control.

1.3) An equation for a control link of each node of the cyber-physical power systems under distributed control is established.

The equation for the control link of the node i of the cyber-physical power systems under distributed control is as follows.

$$u_i^p(t) = C_i \cdot x_i^c((t-\tau_{e,i})) \tag{15}$$

where $C_i$ denotes an incidence matrix from the cyber state variable of the node i to a physical control variable of the node i, $u_i^p(t)$ denotes the physical control variable of the node i, and $\tau_{e,i}$ denotes a time-delay for controlling of the node i.

1.4) Simultaneous equations of the equations for the measuring link, the equations for the communication iteration calculating link and the equations for the control link of all nodes together are established, and the cyber side model of the cyber-physical power systems under distributed control is established as follows.

$$\begin{cases} \dot{x}_i^c = h_i(z_i^c(t), x_{j \in N_i}^c(t - \tau_{c,ij})) & i = 1, 2, \ldots, N \\ 0 = u_i^p - C_i \cdot x_i^c(t - \tau_{e,i}) & i = 1, 2, \ldots, N \\ 0 = z_i^c(t) - \text{diag}(M_{x,i}, M_{y,i}) \cdot \\ [x_i^p(t - \tau_{m,i})^T, y_i^p(t - \tau_{m,i})^T]^T \\ \qquad\qquad i = 1, 2, \ldots, N \end{cases} \tag{16}$$

where diag( ) denotes a partitioned diagonal matrix, and N denotes the number of nodes for the distributed control.

2) The physical power grid model of the cyber-physical power systems under distributed control is established. The detailed blocks are as follows.

2.1) A physical side differential equation of the cyber-physical power systems under distributed control is established as follows.

$$\dot{x}^p(\ )=f^p(x^p(t), y^p(t), u^p(t)) \tag{17}$$

where $f^p$ denotes a dynamic equation of the power systems, $x^p(t)$ denotes a vector of the physical state variables of the cyber-physical power systems at time point t and satisfies $x^p(t)=[x_1^{pT}(t), x_2^{pT}(t), \ldots, x_N^{pT}(t)]^T$, a superscript T denotes transpose, $\dot{x}^p(t)$ denotes a differential of $x^p(t)$ with respect to time, $y^p(t)$ denotes a vector of the physical algebraic variables at time point t, and $u^p(t)$ denotes a vector of the physical control variables at time point t and satisfies $u^p(t)=[u_1^{pT}(t), u_2^{pT}(t), \ldots, u_N^{pT}(t)]^T$.

2.2) A physical side algebraic equation of the cyber-physical power systems under distributed control is established as follows.

$$0=g^p(x^p(t), y^p(t)) \tag{18}$$

where $g^p$ denotes a stability power flow equation of the power systems.

2.3) A physical side algebraic equation with time-delay of the cyber-physical power systems under distributed control is established as follows.

$$\begin{cases} 0 = g^p(x^p(t - \tau_{m,i}), y^p(t - \tau_{m,i})) & i = 1, 2, \ldots, N \\ 0 = g^p(x^p(t - \tau_{e,i}), y^p(t - \tau_{e,i})) & i = 1, 2, \ldots, N \end{cases} \tag{19}$$

2.4) Simultaneous equations of formulas (5)-(7) to establishing the physical power grid model of the cyber-physical power systems under distributed control are established.

3) Simultaneous equations of the formula (4) of the cyber side model in the block 1) and the formulas (5)-(7) of the physical power grid model in the block 2) are established to obtain the unified differential algebraic equation model of the cyber-physical power systems under distributed control as follows.

$$\begin{cases} \dot{x}^p(t) = f^p(x^p(t), y^p(t), u^p(t)) \\ 0 = g^p(x^p(t), y^p(t)) \\ 0 = g^p(x^p(t - \tau_{m,i}), y^p(t - \tau_{m,i})) & i = 1, 2, \ldots, N \\ 0 = g^p(x^p(t - \tau_{e,i}), y^p(t - \tau_{e,i})) & i = 1, 2, \ldots, N \\ \dot{x}_i^c(t) = h_i(z_i^c(t), (x_{j \in N_i}^c)(t - \tau_{c,ij})) & i = 1, 2, \ldots, N \\ 0 = u_i^p(t) - C_i \cdot x_i^c(t - \tau_{e,i}) & i = 1, 2, \ldots, N \\ 0 = z_i^c(t) - \text{diag}(M_{x,i}, M_{y,i}) \cdot \\ [x_i^p(t - \tau_{m,i})^T, y_i^p(t - \tau_{m,i})^T]^T \\ \qquad\qquad i = 1, 2, \ldots, N \end{cases} \tag{20}$$

4) The time-delay characteristic equation expression of the cyber-physical power systems under distributed control is established. The detailed blocks are as follows.

4.1) An equilibrium point of the cyber-physical power systems under distributed control is calculated, and the formula (8) is solved by making the differentials $\dot{x}^p(t)$ and $\dot{x}_i^c(t)$ in the formula (8) both being 0, to obtain a vector of the equilibrium points of the cyber-physical power systems at time point t, namely, $\bar{x}(t)=[\bar{x}^{pT}(t), \bar{x}_1^{cT}(t), \ldots, \bar{x}_i^{cT}(t), \ldots \bar{x}_N^{cT}(t)]^T$, where $\bar{x}^{pT}(t)$ denotes a vector of the equilibrium points of the physical state variables at time point t, $\bar{x}_i^{cT}(t)$ denotes the equilibrium point of the cyber state variable of the node i at time point t.

4.2) Linearization expansion is performed on the formula (8) of the unified differential algebraic equation model of the cyber-physical power systems under distributed control at the equilibrium point, and the following linearized differential algebraic equations is obtained.

$$\begin{cases} \Delta \dot{x}^p(t) = A_0 \Delta x^p(t) + B_0 \Delta y^p(t) + \sum_{i=1}^N E_i \Delta u_i^p(t) \\ 0 = C_0 \Delta x^p(t) + D_0 \Delta y^p(t) \\ 0 = C_{e,i} \Delta x^p(t - \tau_{e,i}) + D_{e,i} \Delta y^p(t - \tau_{e,i}) & i = 1, 2, \ldots, N \\ 0 = C_{m,i} \Delta x^p(t - \tau_{m,i}) + D_{m,i} \Delta y^p(t - \tau_{m,i}) & i = 1, 2, \ldots, N \\ \Delta \dot{x}_i^c = \sum_{j \in N_i} A_{ij}^c \Delta x_j^c(t - \tau_{c,ij}) + B_i^c \Delta z_i^c(t) & i = 1, 2, \ldots, N \\ \Delta u_i^p = C_i \Delta x_i^c(t - \tau_{e,i}) & i = 1, 2, \ldots, N \\ \Delta z_i^c = K_{x,i} \cdot x_i^p(t - \tau_{m,i}) + K_{y,i} \cdot y_i^p(t - \tau_{m,i}) & i = 1, 2, \ldots, N \end{cases} \tag{21}$$

where, $\Delta$ denotes a deviation value of the variable after performing the linearization expansion at the equilibrium point, $A_0$ denotes a Jacobi matrix obtained by taking derivative of $f^p$ with respect to $x^p(t)$, namely satisfies $A_0=\partial f^p/\partial x^p(t)$, $B_0$ denotes a Jacobi matrix obtained by taking the derivative of $f^p$ with respect to $y^p(t)$, namely satisfies $B_0=\partial f^p/\partial y^p(t)$, $E_i$ denotes a Jacobi matrix obtained by taking the derivative of $f^p$ with respect to $u^p(t)$, namely satisfies $E_i=\partial f^p/\partial u_i^p(t)$, $i=1, \ldots, N$, $C_0$ denotes a Jacobi matrix obtained by taking the derivative of $g^p$ with respect to $x^p(t)$, namely satisfies $C_0=\partial g^p/\partial x^p(t)$, $D_0$ denotes a Jacobi matrix obtained by taking the derivative of $g^p$ with respect to $y^p(t)$, namely satisfies $D_0=\partial g^p/\partial y(t)$, $C_{e,i}$ denotes a Jacobi matrix obtained by taking the derivative of $g^p$ with respect to $x^p(t-\tau_{e,i})$, namely satisfies $C_{e,i}=\partial g^p/\partial x^p(t-\tau_{e,i})$, $D_{e,i}$ denotes a Jacobi matrix obtained by taking the derivative of $g^p$ with respect to $y^p(t-\tau_{e,i})$, namely satisfies $D_{e,i}=\partial g^p/\partial y^p(t-\tau_{e,i})$, $C_{m,i}$ denotes a Jacobi matrix obtained by taking the derivative of $g^p$ with respect to $x^p(t-\tau_{m,i})$, namely satisfies $C_{m,i}=\partial g^p/\partial x^p(t-\tau_{m,i})$, $D_{m,i}$ denotes a Jacobi matrix obtained by taking the derivative of $g^p$ with respect to $y^p(t-\tau_{m,i})$, namely satisfies $D_{m,i}=\partial g^p/\partial y^p(t-\tau_{m,i})$, $A_{ij}^c$ denotes a Jacobi matrix obtained by taking the derivative of $h_i$ with respect to $x_j^c(t-\tau_{c,ij})$, namely satisfies $A_{ij}^c=\partial h_i/\partial x_j^c(t-\tau_{c,ij})$, $B_i^c$ denotes a Jacobi matrix obtained by taking the derivative of $h_i$ with respect to $z_i^c(t)$, namely satisfies $B_i^c=\partial h_i/\partial z_i^c(t)$, $C_i$ remains unchanged, $K_{x,i}$ denotes a Jacobi matrix obtained by taking the derivative of $\text{diag}(M_{x,i}, M_{y,i})$ with respect to $x_i^p(t-\tau_{m,i})$, namely satisfies $K_{x,i}=\partial \text{diag}(M_{x,i}, M_{y,i})/\partial x_i^p(t-\tau_{m,i})$, and $K_{y,i}$ denotes a Jacobi matrix obtained by taking the derivative of $\text{diag}(M_{x,i}, M_{y,i})$ with respect to $y_i^p(t-\tau_{m,i})$, namely satisfies $K_{y,i}=\partial \text{diag}(M_{x,i}, M_{y,i})/\partial y_i^p(t-\tau_{m,i})$.

4.3) Algebraic equations in the formula (9) of the linearized differential algebraic equations are eliminated, and the formula (9) is equivalently transformed into time-delay differential equations of the cyber-physical power systems under distributed control as follows:

$$\begin{cases} \Delta \dot{x}(t) = \begin{bmatrix} A_0 - B_0 D_0^{-1} C_0 & 0 \\ 0 & 0 \end{bmatrix} \Delta x(t) + \sum_{i=1}^{N} \begin{bmatrix} 0 & E_i C_i \\ 0 & 0 \end{bmatrix} \cdot \Delta x(t-\tau_{e,i}) + \\ \sum_{i=1}^{N} \sum_{j \in N_i} \begin{bmatrix} 0 & 0 \\ 0 & A_{ij}^c \end{bmatrix} \cdot \Delta x(t-\tau_{c,ij}) + \\ \sum_{i=1}^{N} \begin{bmatrix} 0 & 0 \\ B_i^c K_{x,i} - B_i^c K_{y,i} D_{m,i}^{-1} C_{m,i} & 0 \end{bmatrix} \cdot \Delta x(t-\tau_{m,i}) \end{cases} \quad (22)$$

where a superscript $^{-1}$ of a matrix denotes an inverse matrix of this matrix, x denotes a composite vector of the physical state variables and the cyber state variables, and satisfies $x=[x^{pT}, x_1^{cT}, \ldots, x_i^{cT}, \ldots x_N^{cT}]^T$.

4.4) The following time-delay characteristic equation of the cyber-physical power systems under distributed control is established.

$$\det \begin{pmatrix} s \cdot I - \tilde{A}_0 - \sum_{i=1}^{N_c} T_{m,i} \cdot e^{-s\tau_{m,i}} - \\ \sum_{i=1}^{N_c} \sum_{j \in N_i} T_{ij} \cdot e^{-s\tau_{c,ij}} - \sum_{i=1}^{N_c} T_{e,i} \cdot e^{-s\tau_{e,i}} \end{pmatrix} = 0 \quad (23)$$

where det denotes a determinant, s denotes a characteristic root, e denotes a natural exponential, and $\tilde{A}_0$, $T_{ij}$, $T_{m,i}$, $T_{e,i}$ respectively satisfy:

$$\begin{cases} \tilde{A}_0 = \begin{bmatrix} A_0 - B_0 D_0^{-1} C_0 & 0 \\ 0 & 0 \end{bmatrix}, T_{ij} = \begin{bmatrix} 0 & 0 \\ 0 & A_{ij}^c \end{bmatrix} \\ T_{m,i} = \begin{bmatrix} 0 & 0 \\ B_i^c K_{x,i} - B_i^c K_{y,i} D_{m,i}^{-1} C_{m,i} & 0 \end{bmatrix}, T_{e,i} = \begin{bmatrix} 0 & E_i C_i \\ 0 & 0 \end{bmatrix} \end{cases} \quad (24)$$

5) The time-delay of each node is determined and the stability criterion for the time-delay of the cyber-physical power systems under distributed control is performed. The detailed blocks are as follows.

5.1) The time-delay for measuring of each node $\tau_{m,i}$, $i=1, 2, \ldots, N$, the time-delay for controlling of each node $\tau_{e,i}$, $i=1, 2, \ldots, N$ and the time-delay $\tau_{c,ij}$ for communication between each node $i=1, 2, \ldots, N$ and neighbor nodes $j \in N_i$ of the node are set, then the formula (11) of the time-delay characteristic equation is solved to obtain all characteristic roots of the equation. A characteristic root having the maximum real part is denoted as $\lambda_1$, and the real part of $\lambda_1$ is $\text{Re}(\lambda_1)$.

5.2) It is determined whether $\text{Re}(\lambda_1)$ is greater than 0. In response to $\text{Re}(\lambda_1)$ being greater than 0, the cyber-physical power systems under distributed control is determined to be unstable. In response to $\text{Re}(\lambda_1)$ being less than or equal to 0, the cyber-physical power systems under distributed control is determined to be stable. The stability criterion for the time-delay completes.

Characteristics and Beneficial Effects of the Present Disclosure are:

The present disclosure provides a stability criterion for time-delay of cyber-physical power systems under distributed control. The method of the present disclosure may be applied to the architecture design, the communication networking and the formulation of the communication requirements of the power system under distributed control, and may clarify the influence of the distributed control on the stability of the cyber-physical power systems under different time-delays.

DETAILED DESCRIPTION

The present disclosure provides a stability criterion for time-delay of cyber-physical power systems under distributed control. The following will further explain in combination with specific embodiments.

The present disclosure provides a stability criterion for time-delay of cyber-physical power systems under distributed control. First a cyber side model of the cyber-physical power systems under distributed control is established. The cyber-side model includes an equation for a measuring link, an equation for a communication iterative calculating link and an equation for a control link of the cyber-physical power systems under distributed control. A physical power grid model of the cyber-physical power systems under distributed control is established. The model includes a differential equation reflecting a dynamic process of a power grid and an algebraic equation reflecting a connection relationship of the power grid and a steady state process. Then simultaneous equations of the cyber side model and the physical power grid model is established to establish a unified differential algebraic equation model of the cyber-physical power systems under distributed control, so as to obtain a time-delay characteristic equation expression of the cyber-physical power systems under distributed control. Finally, a time-delay of each node is determined, and the time-delay characteristic equation expression is solved to obtain a maximum characteristic root, and the stability criterion for the time-delay of the cyber-physical power systems under distributed control is performed according to a real part of the maximum characteristic root. The method of the present disclosure may be applied to architecture design, communication networking and formulation of communication requirements of the power system under distributed control, and may clarify an influence of the distributed control on the stability of the cyber-physical power systems under different time-delays.

Figure 1:
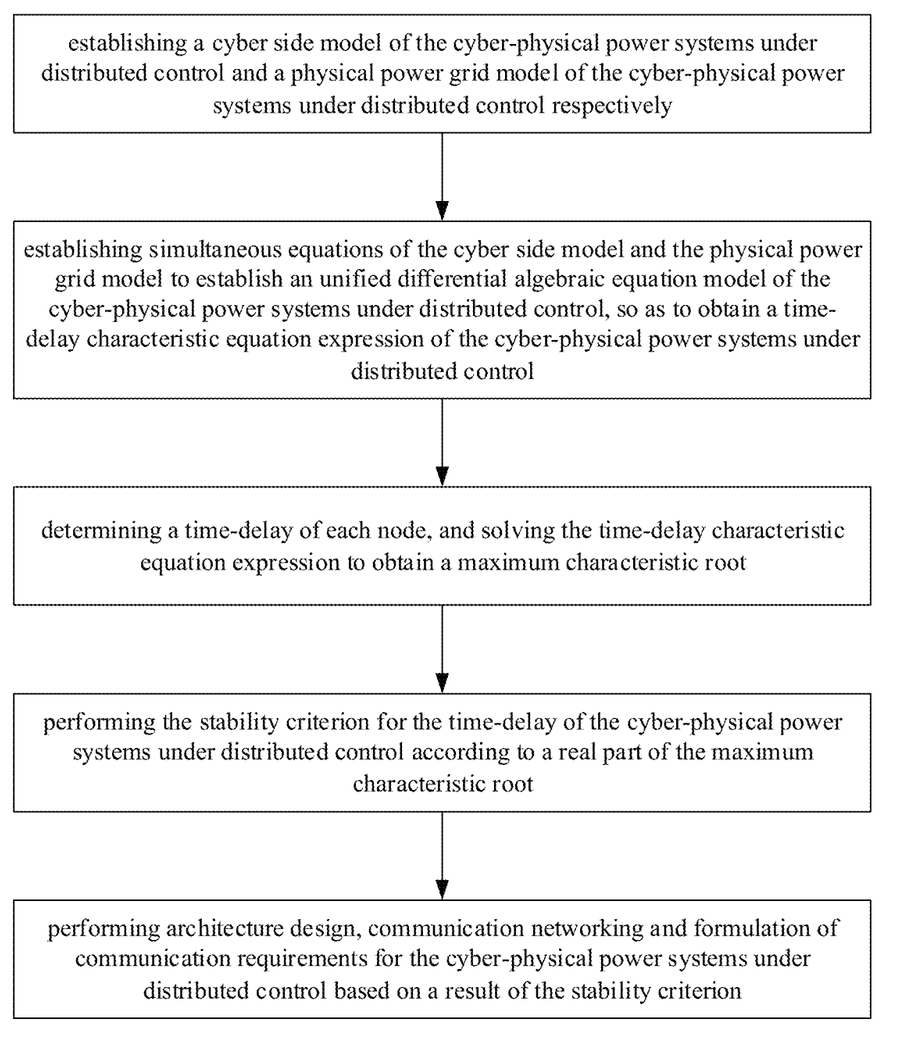
FIG. 1 is a flowchart illustrating a stability criterion for time-delay of cyber-physical power systems under distributed control according to an embodiment of the present disclosure.

The method includes the following blocks, as shown in FIG. 1.

1) The cyber side model of the cyber-physical power systems under distributed control is established. The cyber side model includes the equation for the measuring link, the equation for the communication iterative calculating link, and the equation for the control link of the cyber-physical power systems under distributed control. The detailed blocks are as follows.

1.1) An equation for a measuring link of each node of the cyber-physical power systems under distributed control is established.

The equation for the measuring link of a node i of the cyber-physical power systems under distributed control is as follows.

$$z_i^c(t) = \begin{bmatrix} M_{x,i} & 0 \\ 0 & M_{y,i} \end{bmatrix} \cdot \begin{bmatrix} x_i^p(t - \tau_{m,i}) \\ y_i^p(t - \tau_{m,i}) \end{bmatrix} \quad (25)$$

where a superscript c denotes a cyber side of the cyber-physical power systems, a superscript p denotes a physical side of the cyber-physical power systems, $x_i^p(t-\tau_{m,i})$ denotes a physical state variable of the node i at time point $t-\tau_{m,i}$ (for example, phase angle of the node, frequency, voltage, etc., the physical state variable may be selected one or more from these), $y_i^p(t-\tau_{m,i})$ denotes a physical algebraic variable of the node i at time point $t-\tau_{m,i}$ (For example, active power output of the node, reactive power output, active power load, reactive power load, etc., the physical algebraic variable may be selected one or more from these), $z_i^c(t)$ denotes a cyber measuring variable of the node i at time point t (the physical state variable and physical algebraic variable of the node i are converted into digital quantities on the cyber side through measuring), $\tau_{m,i}$ denotes a time-delay for measuring of the node i, $M_{x,i}$ denotes an incidence matrix from the physical state variable of the node i to the cyber measuring variable of the node i, where x denotes the corresponding physical state variable, i denotes the reference number corresponding to the node, when a fault is not considered, $M_{x,i}$ denotes a diagonal matrix with diagonal elements all 1 (the number of rows of the matrix is the same as a dimension of $z_i^c(t)$, and the number of columns of the matrix is the same as a dimension of $x_i^p(t-\tau_m)$), $M_{y,i}$ denotes an incidence matrix from the physical algebraic variable of the node i to the cyber measuring variable of the node i, where y denotes the corresponding physical algebraic variable, i denotes the reference number corresponding to the node, when the fault is not considered, $M_{y,i}$ denotes a diagonal matrix with diagonal elements all 1 (the number of rows of the matrix is the same as a dimension of $z_i^c(t)$, and the number of columns of the matrix is the same as a dimension of $y_i^p(t-\tau_{m,i})$).

1.2) An equation for a communication iterative calculating link of each node of the cyber-physical power systems under distributed control is established.

The equation for the communication iterative calculating link of the node i of the cyber-physical power systems under distributed control is as follows.

$$\dot{x}_i^c(t) = h_i(z_i^c(t), x_{j \in N_i}^c(t - \tau_{c,ij})) \quad (26)$$

where $x_i^c(t)$ denotes a cyber state variable of the node i at time point t (for example, a tiny increasing rate or an output of a generator of the node i for advanced application decision-making on the cyber side depends on parameters of the specific algorithm iteration under distributed control), $\dot{x}_i^c(t)$ denotes a differential of $x_i^c(t)$ with respect to time, namely $\dot{x}_i^c(t) = dx_i^c(t)/dt$, $N_i$ denotes a set of reference numbers of neighbor nodes communicating with the node i each other, $x_{j \in N_i}^c(t)$ denotes a cyber state variable of the neighbor node of the node i at time point t, $\tau_{c,ij}$ denotes a time-delay for communication between the node i and a neighbor node j of the node i, and $h_i$ denotes an iterative correction function of the node i under distributed control.

1.3) An equation for a control link of each node of the cyber-physical power systems under distributed control is established.

The equation for the control link of the node i of the cyber-physical power systems under distributed control is as follows.

$$u_i^p(t) = C_i \cdot x_i^c(t - \tau_{e,i}) \quad (27)$$

where $C_i$ denotes an incidence matrix from the cyber state variable of the node i to a physical control variable of the node i (the number of rows of the matrix is the same as a dimension of $u_i^p(t)$, and the number of columns of the matrix is the same as a dimension of $x_i^c(t-\tau_{e,i})$), when the fault is not considered, $C_i$ denotes a diagonal matrix with diagonal elements all 1, $u_i^p(t)$ denotes the physical control variable of the node i (corresponding to an adjustable device in the physical power grid, such as the active power output of the generator, etc.), and $\tau_{e,i}$ denotes a time-delay for controlling of the node i.

1.4) Simultaneous equations of the formula (1) to (3) of the equations for the measuring link, the equations for the communication iteration calculating link and the equations for the control link of all nodes (i=1, . . . , N, N denotes the number of nodes for the distributed control) together are established, and the cyber side model of the cyber-physical power systems under distributed control is established as follows.

$$\begin{cases} \dot{x}_i^c = h_i\left(z_i^c(t), x_{j \in N_i}^c(t - \tau_{c,ij})\right) & i = 1, 2, \ldots, N \\ 0 = u_i^p - C_i \cdot x_i^c(t - \tau_{e,i}) & i = 1, 2, \ldots, N \\ 0 = z_i^c(t) - \text{diag}(M_{x,i}, M_{y,i}) \cdot \\ \quad [x_i^p(t - \tau_{m,i})^T, y_i^p(t - \tau_{m,i})^T]^T \\ \hspace{4cm} i = 1, 2, \ldots, N \end{cases} \quad (28)$$

where diag( ) denotes a partitioned diagonal matrix.

2) The physical power grid model of the cyber-physical power systems under distributed control is established. The model includes the differential equation reflecting the dynamic process of the power grid and the algebraic equation reflecting the connection relationship of the power grid and the steady state process. The detailed blocks are as follows.
2.1) A physical side differential equation of the cyber-physical power systems under distributed control is established as follows.

$$\dot{x}^P(t) = f^P(x^P(t), y^P(t), u^P(t)) \quad (29)$$

where $f^P$ denotes a dynamic equation of the power systems, $x^P(t)$ denotes a vector of the physical state variables of the cyber-physical power systems at time point t and satisfies $x^P(t) = [x_1^{PT}(t), x_2^{PT}(t), \ldots, x_N^{PT}(t)]^T$, a superscript T denotes transpose, $\dot{x}^P(t)$ denotes a differential of $x^P(t)$ with respect to time, $y^P(t)$ denotes a vector of the physical algebraic variables at time point t, $u^P(t)$ denotes a vector of the physical control variables at time point t and satisfies $u^P(t) = [u_1^{PT}(t), u_2^{PT}(t), \ldots, u_N^{PT}(t)]^T$.
2.2) A physical side algebraic equation of the cyber-physical power systems under distributed control is established as follows.

$$0 = g^P(x^P(t), y^P(t)) \quad (30)$$

where $g^P$ denotes a stability power flow equation of the power systems.
2.3) A physical side algebraic equation with time-delay of the cyber-physical power systems under distributed control is established as follows.

$$\begin{cases} 0 = g^P(x^P(t - \tau_{m,i}), y^P(t - \tau_{m,i})) & i = 1, 2, \ldots, N \\ 0 = g^P(x^P(t - \tau_{e,i}), y^P(t - \tau_{e,i})) & i = 1, 2, \ldots, N \end{cases} \quad (31)$$

2.4) Simultaneous equations of formulas (5)-(7) to establishing the physical power grid model of the cyber-physical power systems under distributed control are established.
3) The unified differential algebraic equation model of the cyber-physical power systems under distributed control is established.

Simultaneous equations of the formula (4) of the cyber side model in the block 1) and the formulas (5)-(7) of the physical power grid model in the block 2) are established, to obtain the unified differential algebraic equation model of the cyber-physical power systems under distributed control as follows $$\begin{cases} \dot{x}^P(t) = f^P(x^P(t), y^P(t), u^P(t)) \\ 0 = g^P(x^P(t), y^P(t)) \\ 0 = g^P(x^P(t - \tau_{m,i}), y^P(t - \tau_{m,i})) & i = 1, 2, \ldots, N \\ 0 = g^P(x^P(t - \tau_{e,i}), y^P(t - \tau_{e,i})) & i = 1, 2, \ldots, N \\ \dot{x}_i^c = h_i\left(z_i^c(t), x_{j \in N_i}^c(t - \tau_{c,ij})\right) & i = 1, 2, \ldots, N \\ 0 = u_i^P(t) - C_i \cdot x_i^c(t - \tau_{e,i}) & i = 1, 2, \ldots, N \\ 0 = z_i^c(t) - \text{diag}(M_{x,i}, M_{y,i}) \cdot \\ \quad [x_i^P(t - \tau_{m,i})^T, y_i^P(t - \tau_{m,i})^T]^T \\ & i = 1, 2, \ldots, N \end{cases} \quad (32)$$

4) The time-delay characteristic equation expression of the cyber-physical power systems under distributed control is established. The detailed blocks are as follows.
4.1) An equilibrium point of the cyber-physical power systems under distributed control is calculated, and the formula (8) is solved by making the differentials $\dot{x}^P(t)$ and $\dot{x}_i^c(t)$ in the formula (8) both being 0, to obtain a vector of the equilibrium points (that is, a point at which the system may maintain stability without disturbance) of the cyber-physical power systems at time point t, namely, $\bar{x}(t) = [\bar{x}^{PT}(t), \bar{x}_1^{cT}(t), \ldots, \bar{x}_i^{cT}(t), \ldots \bar{x}_N^{cT}(t)]^T$, where $\bar{x}^{PT}(t)$ denotes a vector of the equilibrium points of the physical state variables at time point t (the vector includes the equilibrium point of each physical state variable), $\bar{x}_i^{cT}(t)$ denotes the equilibrium point of the information state variable of the node i at time point t.
4.2) Linearization expansion is performed on the formula (8) of the unified differential algebraic equation model of the cyber-physical power systems under distributed control at the equilibrium point, and the following linearized differential algebraic equations may be obtained.

$$\begin{cases} \Delta \dot{x}^P(t) = A_0 \Delta x^P(t) + B_0 \Delta y^P(t) + \sum_{i=1}^{N} E_i \Delta u_i^P(t) \\ 0 = C_0 \Delta x^P(t) + D_0 \Delta y^P(t) \\ 0 = C_{e,i} \Delta x^P(t - \tau_{e,i}) + D_{e,i} \Delta y^P(t - \tau_{e,i}) & i = 1, 2, \ldots, N \\ 0 = C_{m,i} \Delta x^P(t - \tau_{m,i}) + D_{m,i} \Delta y^P(t - \tau_{m,i}) & i = 1, 2, \ldots, N \\ \Delta \dot{x}_i^c = \sum_{J \in N_i} A_{ij}^c \Delta x_j^c(t - \tau_{c,ij}) + B_i^c \Delta z_i^c(t) & i = 1, 2, \ldots, N \\ \Delta u_i^P = C_i \Delta x_i^c(t - \tau_{e,i}) & i = 1, 2, \ldots, N \\ \Delta z_i^c = K_{x,i} \cdot x_i^P(t - \tau_{m,i}) + K_{y,i} \cdot y_i^P(t - \tau_{m,i}) & i = 1, 2, \ldots, N \end{cases} \quad (33)$$

where $\Delta$ denotes a deviation value of the variable after performing the linearization expansion at the equilibrium point, $A_0$ denotes a Jacobi matrix obtained by taking derivative of $f^P$ with respect to $x^P(t)$, namely satisfies $A_0 = \partial f^P / \partial x^P(t)$, $B_0$ denotes a Jacobi matrix obtained by taking the derivative of $f^P$ with respect to $y^P(t)$, namely satisfies $B_0 = \partial f^P / \partial y^P(t)$, $E_i$ denotes a Jacobi matrix obtained by taking the derivative of $f^P$ with respect to $u_i^P(t)$, namely satisfies $E_i = \partial f^P / \partial u_i^P(t)$, i=1, ..., N, $C_0$ denotes a Jacobi matrix obtained by taking the derivative of $g^P$ with respect to $x^P(t)$, namely satisfies $C_0 = \partial g^P / \partial x^P(t)$, $D_0$ denotes a Jacobi matrix obtained by taking the derivative of $g^P$ with respect to $y^P(t)$, namely satisfies $D_0 = \partial g^P / \partial y^P(t)$, $C_{e,i}$ denotes a Jacobi matrix obtained by taking the derivative of $g^P$ with respect to $x^P(t - \tau_{e,i})$, namely satisfies $C_{e,i} = \partial g^P / \partial x^P(t - \tau_{e,i})$, $D_{e,i}$ denotes a Jacobi matrix obtained by taking the derivative of $g^P$ with respect to $y^P(t - \tau_{e,i})$, namely satisfies $D_{e,i} = \partial g^P / \partial y^P(t - \tau_{e,i})$, $C_{m,i}$ denotes a Jacobi matrix obtained by taking the derivative of $g^P$ with respect to $x^P(t - \tau_{m,i})$, namely satisfies $C_{m,i} = \partial g^P / \partial x^P(t - \tau_{m,i})$, $D_{m,i}$ denotes a Jacobi matrix obtained by taking the derivative of $g^P$ with respect to $y^P(t - \tau_{m,i})$, namely satisfies $D_{m,i} = \partial g^P / \partial y^P(t - \tau_{m,i})$, $A_{ij}^c$ denotes a Jacobi matrix obtained by taking the derivative of $h_i$ with respect to $x_j^c(t - \tau_{c,ij})$, namely satisfies $A_{ij}^c = \partial h_i / \partial x_j^c(t - \tau_{c,ij})$, $B_i^c$ denotes a Jacobi matrix obtained by taking the derivative of $h_i$ with respect to $z_i^c(t)$, namely satisfies $B_i^c = \partial h_i / \partial z_i^c(t)$, $C_i$ remains unchanged, $K_{x,i}$ denotes a Jacobi matrix obtained by taking the derivative of $\text{diag}(M_{x,i}, M_{y,i})$ with respect to $x_i^P(t - \tau_{m,i})$, namely satisfies $K_{x,i}=\partial \text{diag}(M_{x,i}, M_{y,i})/\partial x_i^P(t-\tau_{m,i})$, and $K_{y,i}$ denotes a Jacobi matrix obtained by taking the derivative of $\text{diag}(M_{x,i}, M_{y,i})$ with respect to $y_i^P(t-\tau_{m,i})$, namely satisfies $K_{y,i}=\partial \text{diag}(M_{x,i}, M_{y,i})/\partial y_i^P(t-\tau_{m,i})$.

4.3) Algebraic equations in the formula (9) of the linearized differential algebraic equations are eliminated, and the formula (9) is equivalently transformed into time-delay differential equations of the cyber-physical power systems under distributed control as follows.

$$\begin{cases} \Delta \dot{x}(t) = \begin{bmatrix} A_0 - B_0 D_0^{-1} C_0 & 0 \\ 0 & 0 \end{bmatrix} \Delta x(t) + \sum_{i=1}^{N} \begin{bmatrix} 0 & E_i C_i \\ 0 & 0 \end{bmatrix} \cdot \Delta x(t-\tau_{e,i}) + \\ \sum_{i=1}^{N} \sum_{j \in N_i} \begin{bmatrix} 0 & 0 \\ 0 & A_{ij}^c \end{bmatrix} \cdot \Delta x(t-\tau_{c,ij}) + \\ \sum_{i=1}^{N} \begin{bmatrix} 0 & 0 \\ B_i^c K_{x,i} - B_i^c K_{y,i} D_{m,i}^{-1} C_{m,i} & 0 \end{bmatrix} \cdot \Delta x(t-\tau_{m,i}) \end{cases} \quad (34)$$

where a superscript $^{-1}$ of a matrix denotes an inverse matrix of this matrix, x denotes a composite vector of the physical state variables and the information state variables, and satisfies $x=[x^{pT}, x_1^{cT}, \ldots, x_i^{cT}, \ldots x_N^{cT}]^T$.

4.4) The following time-delay characteristic equation of the cyber-physical power systems under distributed control is established.

$$\det \begin{pmatrix} s \cdot I - \tilde{A}_0 - \sum_{i=1}^{N_c} T_{m,i} \cdot e^{-s\tau_{m,i}} - \\ \sum_{i=1}^{N_c} \sum_{j \in N_i} T_{ij} \cdot e^{-s\tau_{c,ij}} - \sum_{i=1}^{N_c} T_{e,i} \cdot e^{-s\tau_{e,i}} \end{pmatrix} = 0 \quad (35)$$

where det denotes a determinant, s denotes a characteristic root, e denotes a natural exponential, and $\tilde{A}_0$, $T_{ij}$, $T_{m,i}$, $T_{e,i}$ respectively satisfy:

$$\begin{cases} \tilde{A}_0 = \begin{bmatrix} A_0 - B_0 D_0^{-1} C_0 & 0 \\ 0 & 0 \end{bmatrix}, T_{ij} = \begin{bmatrix} 0 & 0 \\ 0 & A_{ij}^c \end{bmatrix} \\ T_{m,i} = \begin{bmatrix} 0 & 0 \\ B_i^c K_{x,i} - B_i^c K_{y,i} D_{m,i}^{-1} C_{m,i} & 0 \end{bmatrix}, T_{e,i} = \begin{bmatrix} 0 & E_i C_i \\ 0 & 0 \end{bmatrix} \end{cases} \quad (36)$$

5) The time-delay of each node is determined and the stability criterion for the time-delay of the cyber-physical power systems under distributed control is performed. The detailed blocks are as follows.

5.1) The time-delay for measuring of each node $\tau_{m,i}$, i=1, 2 ..., N, the time-delay for controlling of each node $\tau_{e,i}$, i=1, 2 ..., N and the time-delay $\tau_{c,ij}$ for communication between each node i=1, 2, ..., N and neighbor nodes $j \in N_i$ of the node are set, then the formula (11) of the time-delay characteristic equation is solved, to obtain all characteristic roots of the equation. A characteristic root having the maximum real part is denoted as $\lambda_1$, and the real part of $\lambda_1$ is $\text{Re}(\lambda_1)$.

5.2) It is determined whether $\text{Re}(\lambda_1)$ is greater than 0. In response to $\text{Re}(\lambda_1)$ being greater than 0, the cyber-physical power systems under distributed control is determined to be unstable. In response to $\text{Re}(\lambda_1)$ being less than or equal to 0, the cyber-physical power systems under distributed control is determined to be stable. The stability criterion for the time-delay completes.

The following further describes the present disclosure in detail in combination with an embodiment as follows.

This embodiment provides the stability criterion for time-delay of cyber-physical power systems under distributed control. The method includes the following blocks.

1) The cyber side model of the cyber-physical power systems under distributed control is established. The cyber side model includes the equation for the measuring link, the equation for the communication iterative calculating link, and the equation for the control link of the cyber-physical power systems under distributed control. The detailed blocks are as follows.

1.1) The equation for the measuring link of each node of the cyber-physical power systems under distributed control is established.

The equation for the measuring link of the node i of the cyber-physical power systems under distributed control is as follows.

$$z_i^c(t) = \begin{bmatrix} M_{x,i} & 0 \\ 0 & M_{y,i} \end{bmatrix} \cdot \begin{bmatrix} x_i^p(t-\tau_{m,i}) \\ y_i^p(t-\tau_{m,i}) \end{bmatrix} \quad (37)$$

where the superscript c denotes an cyber side of the cyber-physical power systems, the superscript p denotes the physical side of the cyber-physical power systems, $x_i^P(t-\tau_{m,i})$ denotes the physical state variable of the node i at time point $t-\tau_{m,i}$ (in this embodiment the phase angle of the node and the frequency of the node in a second-order equation of a dynamic power system are selected), $y_i^P(t-\tau_{m,i})$ denotes the physical algebraic variable of the node i at time point $t-\tau_{m,i}$ (in this embodiment the active power output of the node, the active power load of the node are selected), $z_i^c(t)$ denotes an information measuring variable of the node i at time point t (the physical state variable and physical algebraic variable of the node i are converted into digital quantities on the cyber side through measuring), $\tau_{m,i}$ denotes the time-delay for measuring of the node i, $M_{x,i}$ denotes an incidence matrix from the physical state variable of the node i to the information measuring variable of the node i, where x denotes the corresponding physical state variable, i denotes the reference number corresponding to the node, when the fault is not considered, $M_{x,i}$ denotes the diagonal matrix with diagonal elements all 1 (the number of rows of the matrix is the same as the dimension of $z_i^c(t)$, and the number of columns of the matrix is the same as the dimension of $x_i^P(t-\tau_{m,i})$), $M_{y,i}$ denotes an incidence matrix from the physical algebraic variable of the node i to the information measuring variable of the node i, where y denotes the corresponding physical algebraic variable, i denotes the reference number corresponding to the node, when the fault is not considered, $M_{y,i}$ denotes the diagonal matrix with diagonal elements all 1 (the number of rows of the matrix is the same as the dimension of $z_i^c(t)$, and the number of columns of the matrix is the same as the dimension of $y_i^P(t-\tau_{m,i})$).

1.2) The equation for the communication iterative calculating link of each node of the cyber-physical power systems under distributed control is established.

The equation for the communication iterative calculating link of the node i of the cyber-physical power systems under distributed control is as follows.

$$\dot{x}_i^c(t) = h_i(z_i^c(t), x_{j \in N_i}^c(t-\tau_{c,ij})) \quad (38)$$

where $x_i^c(t)$ denotes an information state variable of the node i at time point t (in this embodiment the tiny increasing rate of the generator of is selected to realize economic distribution of the second frequency modulation stage according to distributed frequency control), $\dot{x}_i^c(t)$ denotes the differential of $x_i^c(t)$ with respect to time, namely $\dot{x}_i^c(t)=dx_i^c(t)/dt$, $N_i$ denotes the set of reference numbers of neighbor nodes communicating with the node i each other, $x_{j\in N_i}^c(t)$ denotes an information state variable of the neighbor node of the node i at time point t, $\tau_{c,ij}$ denotes the time-delay for communication between the node i and the neighbor node j of the node i, and $h_i$ denotes an iterative correction function of the node i under distributed control.

1.3) The equation for the control link of each node of the cyber-physical power systems under distributed control is established.

The equation for the control link of the node i of the cyber-physical power systems under distributed control is as follows.

$$u_i^p(t)=C_i\cdot x_i^c(t-\tau_{e,i}) \tag{39}$$

where $C_i$ denotes an incidence matrix from the information state variable of the node i to the physical control variable of the node i (the number of rows of the matrix is the same as the dimension of $u_i^p(t)$, and the number of columns of the matrix is the same as the dimension of $x_i^c(t-\tau_{e,i})$), when the fault is not considered, $C_i$ denotes the diagonal matrix with diagonal elements all 1, $u_i^p(t)$ denotes the physical control variable of the node i (corresponding to an adjustable device in the physical power grid, such as the active power output of the generator, etc.), and $\tau_{e,i}$ denotes the time-delay for controlling of the node i.

1.4) The simultaneous equations of the formula (1) to (3) of the equations for the measuring link, the equations for the communication iteration calculating link and the equations for the control link of all nodes (i=1, ..., N, N denotes the number of nodes for the distributed control) together are established, and the cyber side model of the cyber-physical power systems under distributed control is established as follows.

$$\begin{cases} \dot{x}_i^c = h_i(z_i^c(t), x_{j\in N_i}^c(t-\tau_{c,ij})) \ i=1,2\ldots,N \\ 0 = u_i^p - C_i\cdot x_i^c(t-\tau_{e,i}) \ i=1,2\ldots,N \\ 0 = z_i^c(t) - diag(M_{x,i}, M_{y,i})\cdot [x_i^p(t-\tau_{m,i})^T, y_i^p(t-\tau_{m,i})^T]^T \\ i=1,2\ldots,N \end{cases} \tag{40}$$

where diag( ) denotes the partitioned diagonal matrix.

2) The physical power grid model of the cyber-physical power systems under distributed control is established. The model includes the differential equation reflecting the dynamic process of the power grid and the algebraic equation reflecting the connection relationship of the power grid and the steady state process. The detailed blocks are as follows.

2.1) The physical side differential equation of the cyber-physical power systems under distributed control is established as follows.

$$\dot{x}^p(t)=f^p(x^p(t),y^p(t),u^p(t)) \tag{41}$$

where $f^p$ denotes the dynamic equation of the power systems, $x^p(t)$ denotes the vector of the physical state variables of the cyber-physical power systems at time point t and satisfies $x^p(t)=[x_2^{pT}(t), x_2^{pT}(t), \ldots, x_N^{pT}(t)]^T$, the superscript T denotes transpose, $\dot{x}^p(t)$ denotes the differential of $x^p(t)$ with respect to time, $y^p(t)$ denotes the vector of the physical algebraic variables at time point t (since the power flow equations associated with physical algebraic variables require to be calculated uniformly throughout the grid, $y^p(t)$ is not listed in nodes), and $u^p(t)$ denotes the vector of the physical control variables at time point t and satisfies $u^p(t)=[u_1^{pT}(t), u_2^{pT}(t), \ldots, u_N^{pT}(t)]^T$.

2.2) The physical side algebraic equation of the cyber-physical power systems under distributed control is established as follows.

$$0=g^p(x^p(t),y^p(t)) \tag{42}$$

where $g^p$ denotes the stability power flow equation of the power systems.

2.3) The physical side algebraic equation with time-delay of the cyber-physical power systems under distributed control is established as follows $$\begin{cases} 0 = g^p(x^p(t-\tau_{m,i}), y^p(t-\tau_{m,i})) \ i=1,2,\ldots,N \\ 0 = g^p(x^p(t-\tau_{e,i}), y^p(t-\tau_{e,i})) \ i=1,2,\ldots,N \end{cases} \tag{43}$$

2.4) The simultaneous equations of formulas (5)-(7) to establishing the physical power grid model of the cyber-physical power systems under distributed control are established.

3) The unified differential algebraic equation model of the cyber-physical power systems under distributed control is established.

The simultaneous equations of the formula (4) of the cyber side model in the block 1) and the formulas (5)-(7) of the physical power grid model in the block 2) are established, to obtain the unified differential algebraic equation model of the cyber-physical power systems under distributed control as follows $$\begin{cases} \dot{x}^p(t) = f^p(x^p(t), y^p(t), u^p(t)) \\ 0 = g^p(x^p(t), y^p(t)) \\ 0 = g^p(x^p(t-\tau_{m,i}), y^p(t-\tau_{m,i})) \ i=1,2,\ldots,N \\ 0 = g^p(x^p(t-\tau_{e,i}), y^p(t-\tau_{e,i})) \ i=1,2,\ldots,N \\ \dot{x}_i^c(t) = h_i(z_i^c(t), x_{j\in N_i}^c(t-\tau_{c,ij})) \ i=1,2,\ldots,N \\ 0 = u_i^p(t) - C_i\cdot x_i^c(t-\tau_{e,i}) \ i=1,2,\ldots,N \\ 0 = z_i^c(t) - diag(M_{x,i}, M_{y,i})\cdot [x_i^p(t-\tau_{m,i})^T, y_i^p(t-\tau_{m,i})^T]^T \\ i=1,2,\ldots,N \end{cases} \tag{44}$$

4) The time-delay characteristic equation expression of the cyber-physical power systems under distributed control is established. The detailed blocks are as follows.

4.1) The equilibrium point of the cyber-physical power systems under distributed control is calculated, and the formula (8) is solved by making the differentials $\dot{x}^p(t)$ and $\dot{x}_i^c(t)$ in the formula (8) both being 0, to obtain the vector of the equilibrium points (that is, a point at which the system may maintain stability without disturbance) of the cyber-physical power systems at time point t, namely, $\bar{x}(t)=[\bar{x}^{pT}(t), \bar{x}_1^{cT}(t), \ldots, \bar{x}_i^{cT}(t), \ldots \bar{x}_N^{cT}(t)]^T$, where $\bar{x}^{pT}(t)$ denotes the vector of the equilibrium points of the physical state variables at time point t (the vector includes the equilibrium point of each physical state variable), $\bar{x}_i^{cT}(t)$ denotes the equilibrium point of the information state variable of the node i at time point t.

4.2) The linearization expansion is performed on the formula (8) of the unified differential algebraic equation model of the cyber-physical power systems under distributed control at the equilibrium point, and the following linearized differential algebraic equations may be obtained.

$$\begin{cases} \Delta \dot{x}^p(t) = A_0 \Delta x^p(t) + B_0 \Delta y^p(t) + \sum_{i=1}^{N} E_i \Delta u_i^p(t) \\ 0 = C_0 \Delta x^p(t) + D_0 \Delta y^p(t) \\ 0 = C_{e,i} \Delta x^p(t - \tau_{e,i}) + D_{e,i} \Delta y^p(t - \tau_{e,i}) \ i=1,2,\ldots,N \\ 0 = C_{m,i} \Delta x^p(t - \tau_{m,i}) + D_{m,i} \Delta y^p(t - \tau_{m,i}) \ i=1,2,\ldots,N \\ \Delta \dot{x}_i^c = \sum_{j \in N_i} A_{ij}^c \Delta x_j^c(t - \tau_{c,ij}) + B_i^c \Delta z_i^c(t) \ i=1,2,\ldots,N \\ \Delta u_i^p = C_i \Delta x_i^c(t - \tau_{e,i}) \ i=1,2,\ldots,N \\ \Delta z_i^c = K_{x,i} \cdot x_i^p(t - \tau_{m,i}) + K_{y,i} \cdot y_i^p(t - \tau_{m,i}) \ i=1,2,\ldots,N \end{cases} \quad (45)$$

where $\Delta$ denotes the deviation value of the variable after performing the linearization expansion at the equilibrium point, $A_0$ denotes the Jacobi matrix obtained by taking derivative of $f^p$ with respect to $x^p(t)$, namely satisfies $A_0=\partial f^p/\partial x^p(t)$, $B_0$ denotes the Jacobi matrix obtained by taking the derivative of $f^p$ with respect to $y^p(t)$, namely satisfies $B_0=\partial f^p/\partial y^p(t)$, $E_i$ denotes the Jacobi matrix obtained by taking the derivative of $f^p$ with respect to $u_i^p(t)$, namely satisfies $E_i=\partial f^p/\partial u_i^p(t)$, $i=1,\ldots,N$, $C_0$ denotes the Jacobi matrix obtained by taking the derivative of $g^p$ with respect to $x^p(t)$, namely satisfies $C_0=\partial g^p/\partial x^p(t)$, $D_0$ denotes the Jacobi matrix obtained by taking the derivative of $g^p$ with respect to $y^p(t)$, namely satisfies $D_0=\partial g^p/\partial y^p(t)$, $C_{e,i}$ denotes the Jacobi matrix obtained by taking the derivative of $g^p$ with respect to $x^p(t-\tau_{e,i})$, namely satisfies $C_{e,i}=\partial g^p/\partial x^p(t-\tau_{e,i})$, $D_{e,i}$ denotes the Jacobi matrix obtained by taking the derivative of $g^p$ with respect to $y^p(t-\tau_{e,i})$, namely satisfies $D_{e,i}=\partial g^p/\partial y^p(t-\tau_{e,i})$, $C_{m,i}$ denotes the Jacobi matrix obtained by taking the derivative of $g^p$ with respect to $x^p(t-\tau_{m,i})$, namely satisfies $C_{m,i}=\partial g^p/\partial x^p(t-\tau_{m,i})$, $D_{m,i}$ denotes the Jacobi matrix obtained by taking the derivative of $g^p$ with respect to $y^p(t-\tau_{m,i})$, namely satisfies $D_{m,i}=\partial g^p/\partial y^p(t-\tau_{m,i})$, $A_{ij}^c$ denotes the Jacobi matrix obtained by taking the derivative of $h_i$ with respect to $x_j^c(t-\tau_{m,i})$, namely satisfies $C_{m,i}=\partial g^p/\partial x^p(t-\tau_{m,i})$, $D_{m,i}$ denotes the Jacobi matrix obtained by taking the derivative of $g^p$ with respect to $y^p(t-\tau_{m,i})$, namely satisfies $B_i^c=\partial h_i/\partial z_i^c(t)$, $C_i$ remains unchanged, $K_{x,i}$ denotes the Jacobi matrix obtained by taking the derivative of diag($M_{x,i}$, $M_{y,i}$) with respect to $x_i^p(t-\tau_{m,i})$, namely satisfies $K_{x,i}=\partial \text{diag}(M_{x,i}, M_{y,i})/\partial x_i^p(t-\tau_{m,i})$, and $K_{y,i}$ denotes the Jacobi matrix obtained by taking the derivative of diag($M_{x,i}$, $M_{y,i}$) with respect to $y_i^p(t-\tau_{m,i})$, namely satisfies $K_{y,i}=\partial \text{diag}(M_{x,i}, M_{y,i})/\partial y_i^p(t-\tau_{m,i})$.

4.3) Algebraic equations in the formula (9) of the linearized differential algebraic equations are eliminated, and the formula (9) is equivalently transformed into time-delay differential equations of the cyber-physical power systems under distributed control as follows.

$$\begin{cases} \Delta \dot{x}(t) = \begin{bmatrix} A_0 - B_0 D_0^{-1} C_0 & 0 \\ 0 & 0 \end{bmatrix} \Delta x(t) + \sum_{i=1}^{N} \begin{bmatrix} 0 & E_i C_i \\ 0 & 0 \end{bmatrix} \cdot \Delta x(t - \tau_{e,i}) + \\ \sum_{i=1}^{N} \sum_{j \in N_i} \begin{bmatrix} 0 & 0 \\ 0 & A_{ij}^c \end{bmatrix} \cdot \Delta x(t - \tau_{c,ij}) + \\ \sum_{i=1}^{N} \begin{bmatrix} 0 & 0 \\ B_i^c K_{x,i} - B_i^c K_{y,i} D_{m,i}^{-1} C_{m,i} & 0 \end{bmatrix} \cdot \Delta x(t - \tau_{m,i}) \end{cases} \quad (46)$$

where the superscript $^{-1}$ of the matrix denotes an inverse matrix of this matrix, x denotes the composite vector of the physical state variables and the information state variables, and satisfies $x=[x^{pT}, x_1^{cT}, \ldots, x_i^{cT}, \ldots x_N^{cT}]^T$.

4.4) The following time-delay characteristic equation of the cyber-physical power systems under distributed control is established.

$$\det\left( s \cdot I - \tilde{A}_0 - \sum_{i=1}^{N_c} T_{m,i} \cdot e^{-s\tau_{m,i}} - \sum_{i=1}^{N_c} \sum_{j \in N_i} T_{ij} \cdot e^{-s\tau_{c,ij}} - \sum_{i=1}^{N_c} T_{e,i} \cdot e^{-s\tau_{e,i}} \right) = 0 \quad (47)$$

where det denotes the determinant, s denotes the characteristic root, e denotes the natural exponential, and $\tilde{A}_0$, $T_{ij}$, $T_{m,i}$, $T_{e,i}$ respectively satisfy:

$$\begin{cases} \tilde{A}_0 = \begin{bmatrix} A_0 - B_0 D_0^{-1} C_0 & 0 \\ 0 & 0 \end{bmatrix}, T_{ij} = \begin{bmatrix} 0 & 0 \\ 0 & A_{ij}^c \end{bmatrix} \\ T_{m,i} = \begin{bmatrix} 0 & 0 \\ B_i^c K_{x,i} - B_i^c K_{y,i} D_{m,i}^{-1} C_{m,i} & 0 \end{bmatrix}, T_{e,i} = \begin{bmatrix} 0 & E_i C_i \\ 0 & 0 \end{bmatrix} \end{cases} \quad (48)$$

5) The time-delay of each node is determined and the stability criterion for the time-delay of the cyber-physical power systems under distributed control is performed. The detailed blocks are as follows.

5.1) The time-delay for measuring of each node $\tau_{m,i}$, $i=1,2\ldots,N$, the time-delay for controlling of each node $\tau_{e,i}$, $i=1,2\ldots,N$ and the time-delay $\tau_{c,ij}$ for communication between each node $i=1,2,\ldots,N$ and neighbor nodes $j \in N_i$ of the node are set, then the formula (11) of the time-delay characteristic equation is solved, to obtain all characteristic roots of the equation. The characteristic root having the maximum real part is denoted as $\lambda_1$, and the real part of $\lambda_1$ is Re($\lambda_1$).

5.2) It is determined whether Re($\lambda_1$) is greater than 0. In response to Re($\lambda_1$) being greater than 0, the cyber-physical power systems under distributed control is determined to be unstable. In response to Re($\lambda_1$) being less than or equal to 0, the cyber-physical power systems under distributed control is determined to be stable. The stability criterion for the time-delay completes.

The invention claimed is:
1. A method for stability criterion for time-delay of cyber-physical power systems under distributed control, comprising:
establishing a cyber side model of the cyber-physical power systems under distributed control and a physical power grid model of the cyber-physical power systems under distributed control respectively;
establishing simultaneous equations of the cyber side model and the physical power grid model to establish an unified differential algebraic equation model of the cyber-physical power systems under distributed con- trol, so as to obtain a time-delay characteristic equation expression of the cyber-physical power systems under distributed control;

determining a time-delay of each node of the cyber-physical power systems under distributed control, and solving the time-delay characteristic equation expression to obtain a maximum characteristic root;

performing the stability criterion for the time-delay of the cyber-physical power systems under distributed control according to a real part of the maximum characteristic root; and adjusting architecture design, formulation of communication networking, and communication requirements for the cyber-physical power systems under distributed control based on a result of the stability criterion.

2. The method for stability criterion for time-delay of cyber-physical power systems under distributed control according to claim 1, wherein establishing the cyber side model of the cyber-physical power systems under distributed control comprises:

1.1) establishing an equation for a measuring link of each node of the cyber-physical power systems under distributed control;

1.2) establishing an equation for a communication iterative calculating link of each node of the cyber-physical power systems under distributed control;

1.3) establishing an equation for a control link of each node of the cyber-physical power systems under distributed control; and 1.4) establishing simultaneous equations of the equations for the measuring link, the equations for the communication iteration calculating link and the equations for the control link of all nodes together, and establishing the cyber side model of the cyber-physical power systems under distributed control.

3. The method for stability criterion for time-delay of cyber-physical power systems under distributed control according to claim 2, wherein, the equation for the measuring link of a node i of the cyber-physical power systems under distributed control is as follows:

$$z_i^c(t) = \begin{bmatrix} M_{x,i} & 0 \\ 0 & M_{y,i} \end{bmatrix} \cdot \begin{bmatrix} x_i^p(t - \tau_{m,i}) \\ y_i^p(t - \tau_{m,i}) \end{bmatrix} \quad (1)$$

where a superscript c denotes an cyber side of the cyber-physical power systems, a superscript p denotes a physical side of the cyber-physical power systems, $x_i^p(t-\tau_{m,i})$ denotes a physical state variable of the node i at time point $t-\tau_{m,i}$, $y_i^p(t-\tau_{m,i})$ denotes a physical algebraic variable of the node i at time point $t-\tau_{m,i}$, $z_i^c(t)$ denotes an information measuring variable of the node i at time point t, $\tau_{m,i}$ denotes a time-delay for measuring of the node i, $M_{x,i}$ denotes an incidence matrix from the physical state variable of the node i to the information measuring variable of the node i, and $M_{y,i}$ denotes an incidence matrix from the physical algebraic variable of the node i to the information measuring variable of the node i.

4. The method for stability criterion for time-delay of cyber-physical power systems under distributed control according to claim 3, wherein, the equation for the communication iterative calculating link of the node i of the cyber-physical power systems under distributed control is as follows:

$$\dot{x}_i^c(t) = h_i(z_i^c(t), x_{j \in N_i}^c(t - \tau_{c,ij})) \quad (2)$$

where $x_i^c(t)$ denotes an information state variable of the node i at time point t, $\dot{x}_i^c(t)$ denotes a differential of $x_i^c(t)$ with respect to time, $N_i$ denotes a set of reference numbers of neighbor nodes communicating with the node i each other, $x_{j \in N_i}^c(t)$ denotes an information state variable of the neighbor node of the node i at time point t, $\tau_{c,ij}$ denotes a time-delay for communication between the node i and a neighbor node j of the node i, and $h_i$ denotes an iterative correction function of the node i under distributed control.

5. The method for stability criterion for time-delay of cyber-physical power systems under distributed control according to claim 4, wherein, the equation for the control link of the node i of the cyber-physical power systems under distributed control is as follows:

$$u_i^p(t) = C_i \cdot x_i^c(t - \tau_{e,i}) \quad (3)$$

where $C_i$ denotes an incidence matrix from the information state variable of the node i to a physical control variable of the node i, and $u_i^p(t)$ denotes the physical control variable of the node i, and $\tau_{e,i}$ denotes a time-delay for controlling of the node i.

6. The method for stability criterion for time-delay of cyber-physical power systems under distributed control according to claim 5, wherein the cyber side model of the cyber-physical power systems under distributed control is provided as follows:

$$\begin{cases} \dot{x}_i^c = h_i(z_i^c(t), x_{j \in N_i}^c(t - \tau_{c,ij})) \ i = 1, 2 \ldots, N \\ 0 = u_i^p - C_i \cdot x_i^c(t - \tau_{e,i}) \ i = 1, 2 \ldots, N \\ 0 = z_i^c(t) - diag(M_{x,i}, M_{y,i}) \cdot [x_i^p(t - \tau_{m,i})^T, y_i^p(t - \tau_{m,i})^T]^T \\ i = 1, 2 \ldots, N \end{cases} \quad (4)$$

where diag( ) denotes a partitioned diagonal matrix, and N denotes the number of nodes for the distributed control.

7. The method for stability criterion for tin e-delay of cyber-physical power systems under distributed control according to claim 6, wherein establishing the physical power grid model of the cyber-physical power systems under distributed control comprises:

2.1) establishing a physical side differential equation of the cyber-physical power systems under distributed control;

2.2) establishing a physical side algebraic equation of the cyber-physical power systems under distributed control;

2.3) establishing a physical side algebraic equation with time-delay of the cyber-physical power systems under distributed control; and 2.4) establishing simultaneous equations of the physical side differential equation, the physical side algebraic equation, and the physical side algebraic equation with time-delay, to establish the physical power grid model of the cyber-physical power systems under distributed control.

8. The method for stability criterion for time-delay of cyber-physical power systems under distributed control according to claim 7, wherein the physical side differential equation of the cyber-physical power systems under distributed control is provided as follows;

$$\dot{x}^p(t) = f^p(x^p(t), y^p(t), u^p(t)) \quad (5)$$

where $f^p$ denotes a dynamic equation of the power systems, $x^p(t)$ denotes a vector of the physical state variables of the cyber-physical power systems at time point t and satisfies $x^P(t)=[x_1^{PT}(t), x_2^{PT}(t), \ldots, x_N^{PT}(t)]^T$, a superscript T denotes transpose, $\dot{x}^P(t)$ denotes a differential of $x^P(t)$ with respect to time, $y^P(t)$ denotes a vector of the physical algebraic variables at time point t, and $u^P(t)$ denotes a vector of the physical control variables at time point t and satisfies $u^P(t)=[u_1^{PT}(t), u_2^{PT}(t), \ldots, u_N^{PT}(t)]^T$.

9. The method for stability criterion for time-delay of cyber-physical power systems under distributed control according to claim 8, wherein the physical side algebraic equation of the cyber-physical power systems under distributed control is provided as follows;

$$0 = g^P(x^P(t), y^P(t)) \quad (6)$$

where $g^P$ denotes a stability power flow equation of the power systems.

10. The method for stability criterion for time-delay of cyber-physical power systems under distributed control according to claim 9, wherein the physical side algebraic equation with time-delay of the cyber-physical power systems under distributed control is provided as follows:

$$\begin{cases} 0 = g^P(x^P(t-\tau_{m,i}), y^P(t-\tau_{m,i})) \ i=1,2,\ldots,N \\ 0 = g^P(x^P(t-\tau_{e,i}), y^P(t-\tau_{e,i})) \ i=1,2,\ldots,N \end{cases} \quad (7)$$

11. The method for stability criterion for time-delay of cyber-physical power systems under distributed control according to claim 10, wherein establishing the simultaneous equations of the cyber side model and the physical power grid model to establish the unified differential algebraic equation model of the cyber-physical power systems under distributed control comprises:

establishing simultaneous equations of the formula (4) of the cyber side model in the block 1) and the formulas (5)-(7) of the physical power grid model in the block 2), to obtain the unified differential algebraic equation model of the cyber-physical power systems under distributed control as follows:

$$\begin{cases} \dot{x}^P(t) = f^P(x^P(t), y^P(t), u^P(t)) \\ 0 = g^P(x^P(t), y^P(t)) \\ 0 = g^P(x^P(t-\tau_{m,i}), y^P(t-\tau_{m,i})) \ i=1,2,\ldots,N \\ 0 = g^P(x^P(t-\tau_{e,i}), y^P(t-\tau_{e,i})) \ i=1,2,\ldots,N \\ \dot{x}_i^c(t) = h_i(z_i^c(t), x_{j\in N_i}^c(t-\tau_{c,ij})) \ i=1,2\ldots,N \\ 0 = u_i^P(t) - C_i \cdot x_i^c(t-\tau_{e,i}) \ i=1,2\ldots,N \\ 0 = z_i^c(t) - diag(M_{x,i}, M_{y,i}) \cdot [x_i^P(t-\tau_{m,i})^T, y_i^P(t-\tau_{m,i})^T]^T \\ i=1,2\ldots,N \end{cases} \quad (8)$$

12. The method for stability criterion for time-delay of cyber-physical power systems under distributed control according to claim 11, wherein establishing the time-delay characteristic equation expression of the cyber-physical power systems under distributed control comprises:

4.1) calculating an equilibrium point of the cyber-physical power systems under distributed control;
4.2) performing linearization expansion on the formula (8) of the unified differential algebraic equation model of the cyber-physical power systems under distributed control at the equilibrium point, and obtaining linearized differential algebraic equations;
4.3) eliminating algebraic equations in the formula (9) of the linearized differential algebraic equations, and equivalently transforming the formula (9) into time-delay differential equations of the cyber-physical power systems under distributed control; and
4.4) establishing the time-delay characteristic equation of the cyber-physical power systems under distributed control.

13. The method for stability criterion for time-delay of cyber-physical power systems under distributed control according to claim 12, wherein calculating an equilibrium point of the cyber-physical power systems under distributed control comprises:

solving the formula (8) by making the differentials $\dot{x}^P(t)$ and $\dot{x}_i^c(t)$ in the formula (8) both being 0, to obtain a vector of the equilibrium points of the cyber-physical power systems at time point t, namely, $\bar{x}(t)=[\bar{x}^{PT}(t), \bar{x}_1^{cT}(t),\ldots,\bar{x}_i^{cT}(t),\ldots\bar{x}_N^{cT}(t)]^T$, $\bar{x}^{PT}(t)$ denotes a vector of the equilibrium points of the physical state variables at time point t, $\bar{x}_i^{cT}(t)$ denotes the equilibrium point of the information state variable of the node i at time point t.

14. The method for stability criterion for time-delay of cyber-physical power systems under distributed control according to claim 13, wherein the linearized differential algebraic equations is provided as follows:

$$\begin{cases} \Delta \dot{x}^P(t) = A_0 \Delta x^P(t) + B_0 \Delta y^P(t) + \sum_{i=1}^{N} E_i \Delta u_i^P(t) \\ 0 = C_0 \Delta x^P(t) + D_0 \Delta y^P(t) \\ 0 = C_{e,i} \Delta x^P(t-\tau_{e,i}) + D_{e,i} \Delta y^P(t-\tau_{e,i}) \ i=1,\ldots,N \\ 0 = C_{m,i} \Delta x^P(t-\tau_{m,i}) + D_{m,i} \Delta y^P(t-\tau_{m,i}) \ i=1,\ldots,N \\ \Delta \dot{x}_i^c = \sum_{j\in N_i} A_{ij}^c \Delta x_j^c(t-\tau_{c,ij}) + B_i^c \Delta z_i^c(t) \ i=1,2,\ldots,N \\ \Delta u_i^P = C_i \Delta x_i^c(t-\tau_{e,i}) \ i=1,2,\ldots,N \\ \Delta z_i^c = K_{x,i} \cdot x_i^P(t-\tau_{m,i}) + K_{y,i} \cdot y_i^P(t-\tau_{m,i}) \ i=1,2,\ldots,N \end{cases} \quad (9)$$

where $\Delta$ denotes a deviation value of the variable after performing the linearization expansion at the equilibrium point, $A_0$ denotes a Jacobi matrix obtained by taking derivative of $f^P$ with respect to $x^P(t)$, namely satisfies $A_0=\partial f^P/\partial x^P(t)$, $B_0$ denotes a Jacobi matrix obtained by taking the derivative of $f^P$ with respect to $y^P(t)$, namely satisfies $B_0=\partial f^P/\partial y^P(t)$, $E_i$ denotes a Jacobi matrix obtained by taking the derivative of $f^P$ with respect to $u_i^P(t)$, namely satisfies $E_i=\partial f^P/\partial u_i^P(t)$, $i=1,\ldots,N$, $C_0$ denotes a Jacobi matrix obtained by taking the derivative of $g^P$ with respect to $x^P(t)$, namely satisfies $C_0=\partial g^P/\partial x^P(t)$, $D_0$ denotes a Jacobi matrix obtained by taking the derivative of $g^P$ with respect to $y^P(t)$, namely satisfies $D_0=\partial g^P/\partial y^P(t)$, $C_{e,i}$ denotes a Jacobi matrix obtained by taking the derivative of $g^P$ with respect to $x^P(t-\tau_{e,i})$, namely satisfies $C_{e,i}=\partial g^P/\partial x^P(t-\tau_{e,i})$, $D_{e,i}$ denotes a Jacobi matrix obtained by taking the derivative of $g^P$ with respect to $y^P(t-\tau_{e,i})$, namely satisfies $D_{e,i}=\partial g^P/\partial y^P(t-\tau_{e,i})$, $C_{m,i}$ denotes a Jacobi matrix obtained by taking the derivative of $g^P$ with respect to $x^P(t-\tau_{m,i})$, namely satisfies $C_{m,i}=\partial g^P/\partial x^P(t-\tau_{m,i})$, $D_{m,i}$ denotes a Jacobi matrix obtained by taking the derivative of $g^P$ with respect to $y^P(t-\tau_{m,i})$, namely satisfies $D_{m,i}=\partial g^P/\partial y^P(t-\tau_{m,i})$, $A_{ij}^c$ denotes a Jacobi matrix obtained by taking the derivative of $h_i$ with respect to $x_j^c(t-\tau_{c,ij})$ namely satisfies $A_{ij}^c=\partial h_i/\partial x_j^c(t-$ $\tau_{c,ij}$) $B_i^c$ denotes a Jacobi matrix obtained by taking the derivative of $h_i$ with respect to $z_i^c(t)$, namely satisfies $B_i^c = \partial h_i/\partial z_i^c(t)$; $C_i$ remains unchanged, $K_{x,i}$ denotes a Jacobi matrix obtained by taking the derivative of diag($M_{x,i}$, $M_{y,i}$) with respect to $x_i^p(t-\tau_{m,i})$, namely satisfies $K_{x,i} = \partial \text{diag}(M_{x,i}, M_{y,i})/\partial x_i^p(t-\tau_{m,i})$, $K_{y,i}$ denotes a Jacobi matrix obtained by taking the derivative of diag($M_{x,i}$, $M_{y,i}$) with respect to $y_i^p(t-\tau_{m,i})$, namely satisfies $K_{y,i} = \partial \text{diag}(M_{x,i}, M_{y,i})/\partial y_i^p(t-\tau_{m,i})$.

15. The method for stability criterion for time-delay of cyber-physical power systems under distributed control according to claim 14, wherein the time-delay differential equations of the cyber-physical power systems under distributed control are provided as follows:

$$\begin{cases} \Delta \dot{x}(t) = \begin{bmatrix} A_0 - B_0 D_0^{-1} C_0 & 0 \\ 0 & 0 \end{bmatrix} \Delta x(t) + \sum_{i=1}^{N} \begin{bmatrix} 0 & E_i C_i \\ 0 & 0 \end{bmatrix} \cdot \Delta x(t - \tau_{e,i}) + \\ \sum_{i=1}^{N} \sum_{j \in N_i} \begin{bmatrix} 0 & 0 \\ 0 & A_{ij}^c \end{bmatrix} \cdot \Delta x(t - \tau_{c,ij}) + \\ \sum_{i=1}^{N} \begin{bmatrix} 0 & 0 \\ B_i^c K_{x,i} - B_i^c K_{y,i} D_{m,i}^{-1} C_{m,i} & 0 \end{bmatrix} \cdot \Delta x(t - \tau_{m,i}) \end{cases} \quad (10)$$

where a superscript $^{-1}$ of a matrix denotes an inverse matrix of this matrix, x denotes a composite vector of the physical state variables and the information state variables, and satisfies $x = [x^{pT}, x_1^{cT}, \ldots, x_i^{cT}, \ldots, x_N^{cT}]^T$.

16. The method for stability criterion for time-delay of cyber-physical power systems under distributed control according to claim 15, wherein the time-delay characteristic equation of the cyber-physical power systems under distributed control is provided as follows:

$$\det \begin{bmatrix} s \cdot I - \tilde{A}_0 - \sum_{i=1}^{N_c} T_{m,i} \cdot e^{-s\tau_{m,i}} \\ -\sum_{i=1}^{N_c} \sum_{j \in N_i} T_{ij} \cdot e^{-s\tau_{c,ij}} - \sum_{i=1}^{N_c} T_{e,i} \cdot e^{-s\tau_{e,i}} \end{bmatrix} = 0 \quad (11)$$

where det denotes a determinant, s denotes a characteristic root, e denotes a natural exponential, and $\tilde{A}_0$, $T_{ij}$, $T_{m,i}$, $T_{e,i}$ respectively satisfy:

$$\begin{cases} \tilde{A}_0 = \begin{bmatrix} A_0 - B_0 D_0^{-1} C_0 & 0 \\ 0 & 0 \end{bmatrix}, T_{ij} = \begin{bmatrix} 0 & 0 \\ 0 & A_{ij}^c \end{bmatrix} \\ T_{m,i} = \begin{bmatrix} 0 & 0 \\ B_i^c K_{x,i} - B_i^c K_{y,i} D_{m,i}^{-1} C_{m,i} & 0 \end{bmatrix}, T_{e,i} = \begin{bmatrix} 0 & E_i C_i \\ 0 & 0 \end{bmatrix} \end{cases} \quad (12)$$

17. The method for stability criterion for time-delay of cyber-physical power systems under distributed control according to claim 16, wherein determining the time-delay of each node of the cyber-physical power systems under distributed control and performing the stability criterion for the time-delay of the cyber-physical power systems under distributed control comprises:

5.1) setting the time-delay for measuring of each node $\tau_{m,i}$, i=1, 2 . . . , N, the time-delay for controlling of each node $\tau_{e,i}$, i=1, 2 . . . , N and the time-delay $\tau_{c,ij}$ for communication between each node i=1, 2, . . . , N and neighbor nodes j∈$N_i$ of the node, then solving the formula (11) of the time-delay characteristic equation, to obtain all characteristic roots of the equation, denoting a characteristic root having the maximum real part as $\lambda_1$, the real part of $\lambda_1$ being Re($\lambda_1$); and 5.2) determining whether Re($\lambda_1$) is greater than 0; in response to Re($\lambda_1$) being greater than 0, determining the cyber-physical power systems under distributed control to be unstable; in response to Re($\lambda_1$) being less than or equal to 0, determining the cyber-physical power systems under distributed control to be stable; completing the stability criterion for the time-delay.

\* \* \* \* \*